US 7,818,234 B1

(12) United States Patent
Egan

(10) Patent No.: US 7,818,234 B1
(45) Date of Patent: Oct. 19, 2010

(54) SYSTEM AND METHOD FOR ASSIGNING RATINGS TO MUTUAL FUNDS AND OTHER INVESTMENT FUNDS BASED ON THE VALUE OF VARIOUS FUTURE AND OPTION SECURITIES

(76) Inventor: Sean J. Egan, 212 Laurel La., Haverford, PA (US) 19041

( * ) Notice: Subject to any disclaimer, the term of this patent is extended or adjusted under 35 U.S.C. 154(b) by 2221 days.

(21) Appl. No.: 10/010,102

(22) Filed: Nov. 8, 2001

Related U.S. Application Data

(63) Continuation-in-part of application No. 09/418,184, filed on Oct. 12, 1999, now abandoned.

(51) Int. Cl.
*G06Q 40/00* (2006.01)
*H04L 12/18* (2006.01)
(52) U.S. Cl. .................................. 705/36 R; 705/35
(58) Field of Classification Search ............... 705/36 R
See application file for complete search history.

(56) References Cited

U.S. PATENT DOCUMENTS

| 4,839,804 | A | 6/1989 | Roberts et al. |
| 4,953,085 | A | 8/1990 | Atkins |
| 5,126,936 | A | 6/1992 | Champion et al. |
| 5,132,899 | A | 7/1992 | Fox |
| 5,148,365 | A | 9/1992 | Dembo |
| 5,222,019 | A | 6/1993 | Yoshino et al. |
| 5,237,500 | A | 8/1993 | Perg et al. |
| 5,471,575 | A | 11/1995 | Giansante |
| 5,563,783 | A | 10/1996 | Stolfo et al. |
| 5,799,287 | A | 8/1998 | Dembo |
| 5,802,499 | A | 9/1998 | Sampson et al. |
| 5,806,047 | A | 9/1998 | Hackel et al. |
| 5,812,987 | A | 9/1998 | Luskin et al. |
| 5,819,237 | A | 10/1998 | Garman |
| 5,884,287 | A | 3/1999 | Edesess |
| 5,887,243 | A | 3/1999 | Harvey et al. |
| 5,915,209 | A | 6/1999 | Lawrence |
| 6,003,018 | A | 12/1999 | Michaud et al. |
| 6,078,904 | A | 6/2000 | Rebane |
| 6,336,103 | B1 * | 1/2002 | Baker ..................... 705/36 R |
| 6,546,375 | B1 | 4/2003 | Pang et al. |
| 7,149,715 | B2 | 12/2006 | Browne et al. |

(Continued)

OTHER PUBLICATIONS

Expected value, definition obtained from CREDO reference @ the address listed on the reference, last accessed Jun. 8, 2008.*

(Continued)

*Primary Examiner*—Ella Colbert
*Assistant Examiner*—Daniel L Greene, Jr.
(74) *Attorney, Agent, or Firm*—Drinker Biddle & Reath LLP

(57) ABSTRACT

The present invention is a system and method for assigning ratings on mutual funds and other investment funds based on values of financial futures for sectors corresponding to the funds. The method combines information on the historical rates of return and variability in the rates of return of the funds with the expected range of future returns for various asset classes as determined by the pricing of futures. The rating for the funds incorporates the range of expected future returns, the variability of past returns, and the level of risk.

9 Claims, 2 Drawing Sheets

U.S. PATENT DOCUMENTS

| | | | |
|---|---|---|---|
| 7,171,385 | B1 | 1/2007 | Dembo et al. |
| 2002/0046144 | A1 | 4/2002 | Graff |
| 2006/0190371 | A1 | 8/2006 | Almgren et al. |
| 2006/0242039 | A1 | 10/2006 | Haggerty et al. |
| 2006/0242046 | A1 | 10/2006 | Haggerty et al. |
| 2006/0242047 | A1 | 10/2006 | Haggerty et al. |
| 2006/0242048 | A1 | 10/2006 | Haggerty et al. |
| 2006/0242049 | A1 | 10/2006 | Haggerty et al. |
| 2006/0242050 | A1 | 10/2006 | Haggerty et al. |
| 2006/0242051 | A1 | 10/2006 | Haggerty et al. |
| 2007/0016500 | A1 | 1/2007 | Chatterji et al. |
| 2007/0016501 | A1 | 1/2007 | Chatterji et al. |
| 2007/0067206 | A1 | 3/2007 | Haggerty et al. |
| 2007/0067207 | A1 | 3/2007 | Haggerty et al. |
| 2007/0067208 | A1 | 3/2007 | Haggerty et al. |
| 2007/0067209 | A1 | 3/2007 | Haggerty et al. |
| 2007/0078741 | A1 | 4/2007 | Haggerty et al. |
| 2008/0294570 | A1 | 11/2008 | Egan |

OTHER PUBLICATIONS

Accounting return, definition obtained from CREDO reference @ the address listed on the reference, last accessed Jun. 8, 2008.*

Expected rate of return, definition obtained from CREDO reference @ the address listed on the reference, last accessed Jun. 8, 2008.*

Fund Ratings, Standard and poor's website, available @ http://www2.standardandpoors.com/portal/site/sp/en/us/page.family/ratings_fr/2,1,6,0,0,0,0,0,0,0,0,0,0,0,0,0.html, last accessed Jun. 8, 2008.*

Predicting Long-Term Stock Return Volatility: Implications for Accounting and Valuation of Equity Derivatives Author(s): Andrew W. Alford and James R. Boatsman Source: The Accounting Review, vol. 70, No. 4 (Oct. 1995), pp. 599-618 Published by: American Accounting Association Stable URL: http://www.jstor.org/stable/248249, las accessed: Jul. 6, 2010.*

Macroeconomic Influences and the Variability of the Commodity Futures Basis Author(s): Warren Bailey and K. C. Chan Source: The Journal of Finance, vol. 48, No. 2 (Jun. 1993), pp. 555-573 Published by: Blackwell Publishing for the American Finance Association Stable URL: http://www.jstor.org/stable/2328912, last accessed: Jul. 6, 2010.*

Robert W. Kolb, "OPTIONS"—The Investor's Complete Tool Kit; 1991.

Int'l Search Report dated Aug. 7, 2008.

Office Action mailed Sep. 30, 2009 in U.S. Appl. No. 12/078,395.

* cited by examiner

SYSTEM AND METHOD FOR ASSIGNING RATINGS TO MUTUAL FUNDS AND OTHER INVESTMENT FUNDS BASED ON THE VALUE OF VARIOUS FUTURE AND OPTION SECURITIES

RELATED APPLICATIONS

This application is a continuation-in-part of copending application Ser. No. 09/418,184, filed Oct. 12, 1999.

FIELD OF THE INVENTION

The present invention relates to financial services, and in particular to ratings of investment vehicles.

BACKGROUND OF THE INVENTION

Ratings of investment vehicles are one factor commonly used by investors and financial advisors in determining how to invest. These ratings are typically divided into various types of investments, such as funds with particular investment objectives or types of holdings. Ratings are generally based on past returns. However, investors and their financial advisors are seeking information about future performance, not past performance, of investment vehicles. As a result, existing ratings are limited in their usefulness.

SUMMARY OF THE INVENTION

In one aspect of the invention, there is disclosed a method for assigning ratings to a fund, comprising the steps of:
calculating an expected return over a time period for a sector corresponding to the fund based on financial futures corresponding to the sector,
calculating an expected range of returns for the sector based on prices of options for the futures,
calculating an expected return for the fund over a time period based on the calculated expected return for the corresponding sector, the expected range of returns for the corresponding sector, and on information specific to the fund, and
assigning a rating based on the expected return for the fund.

By combining information on the funds with the expected range of future returns, as implied by the pricing of the futures, one can derive a range of expected future returns, the volatility of future returns, and a rating, which reflects the expected return and the risk of the fund.

DETAILED DESCRIPTION OF THE INVENTION

Figures 1A, 1B:
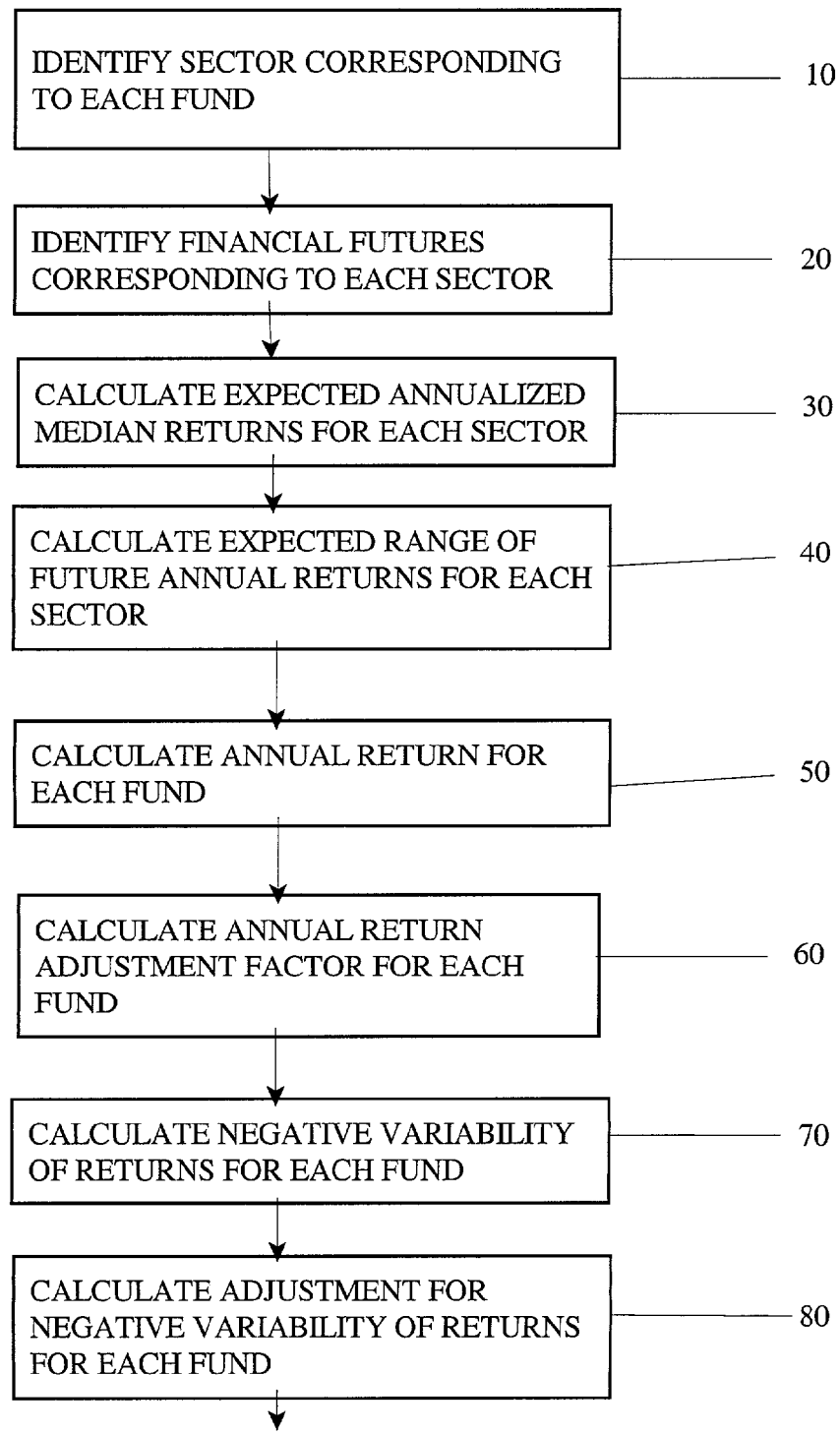
FIGS. 1A and 1B are a flow diagram depicting steps in a method according to the invention
Figure 1B:
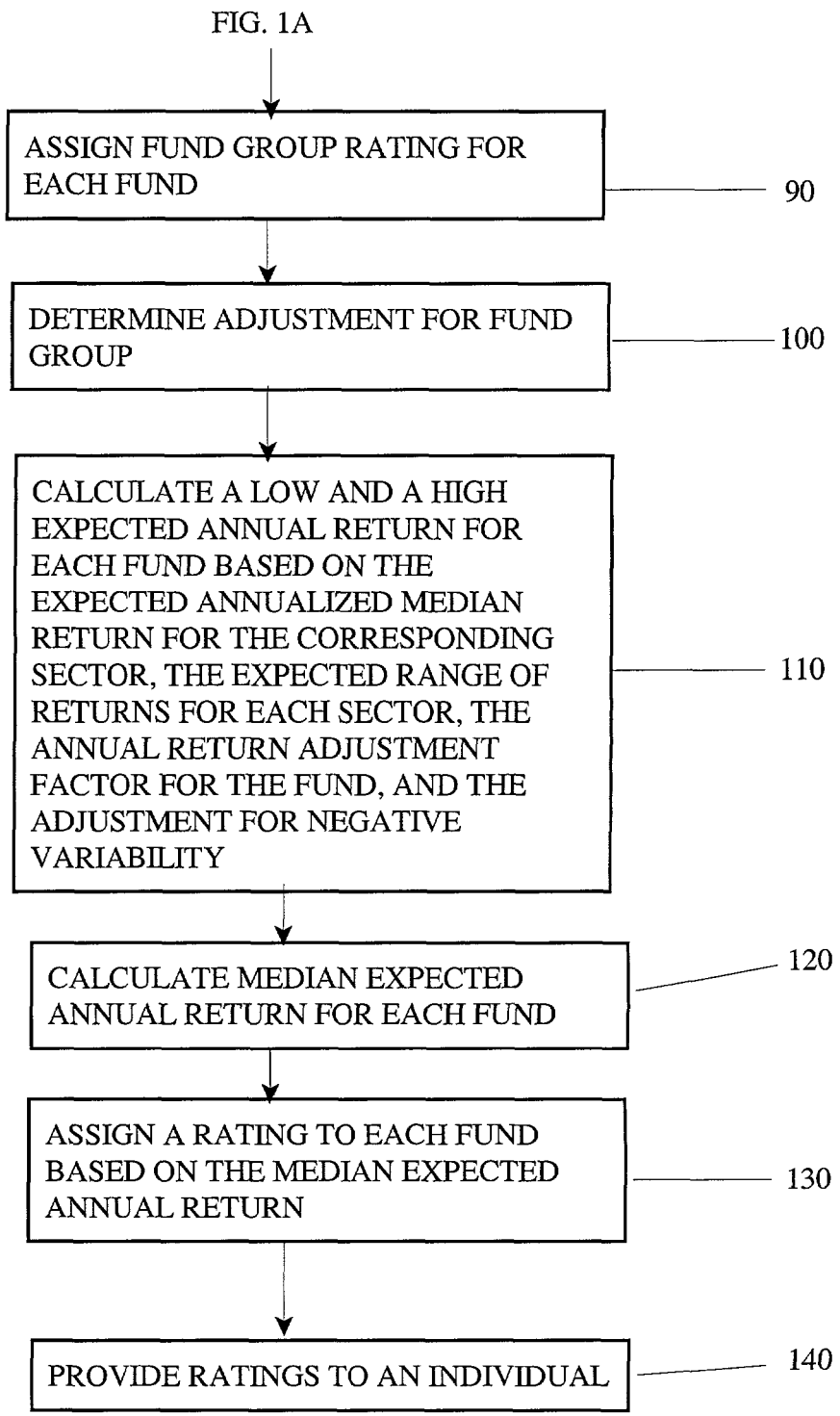

The method and system of the invention employs financial futures in ranking or assessing various investments. Financial futures provide information on expected future returns in various investment areas or asset classes. For example, a financial future on the Standard & Poor's (S&P) 500 for the period ending June 2002 is a representation of what the financial markets expect the value of the S&P500 will be in June 2002. Financial futures are now available for a number of segments of the market, such as US value stocks, US growth stocks, small capitalization stocks, large capitalization stocks, US Treasury Bonds, high yield bonds and other categories.

It is possible to use known mathematical techniques in order to determine expected future returns for various investment vehicles, and in particular actual and virtual funds that comprise a number of securities. Actual funds include traditional mutual funds. Virtual funds include folios, which are collections of individual securities that are assembled by investors or made available from brokerages. These funds may include conventional mutual funds, which hold a variety of securities, or virtual funds, in which investors directly buy and sell securities as they choose or as directed by a manager. In the method of the invention, employing information on the classification of the funds, past performance of the funds, performance of the asset classes to which the funds belong, and futures for the asset classes to which the funds belong, a prediction for future performance can be obtained. The prediction can then be utilized as a rating.

By way of example, future earnings for a large capitalization mutual fund will be explained. For a large capitalization mutual fund, a suitable future would be the S&P 500 future large capitalization mutual fund, if the future indicated that the expected return was an annualized 7%. Using a modification of the Black-Scholes (a widely used option pricing equation developed in 1973 by Fisher Black and Myron Scholes used to price over the counter (OTC) options), one could determine that there was a 66% chance that the return would be within 5 and 9% and a 95% chance that the return would be within 4 and 10% for the period ending June 2000. If the Fund had a historic return that was on average 1% less than the S&P 500, but with the same level of volatility, then the mean expected return would be 6%, and the range of expected returns at the 66% level of confidence would be 4 to 8% (i.e., 1% less than the example with the S&P 500). In the same way, the range of returns at the 95% confidence level would be 3 to 9% (i.e., 1% less than the example with the S&P 500).

In assigning ratings, the expected future return and volatility of future return is compared to that of other investment classes. For example, if large capitalization funds were expected to return 7% with a 4% range at the 66% confidence level, compared to a South American equity fund with an expected return of 5% and a range of 4% at the 66% probability level, the South American sector would be less appealing and therefore have a weaker rating. Note, the relative returns of the fund are incorporated into the expected future return for the sector in deriving ratings. The rating represents the expected risk and reward.

Note, the Black_Scholes model is useful for pricing options, whereas the method of the present invention uses futures pricing to determine the expected future returns for various investment areas, and combining that information with the relative performance of a fund and other information such as an assessment of the capability of the investment managers, support staff and characteristics of portfolio securities to derive a rating.

Referring now to FIGS. 1A and 1B, the method of the invention will be described. The method may be carried out manually, but preferably is implemented in software. The software may include prompts for seeking input from a human operator. The software may alternatively have access to databases containing information about fund performance, option markets, and other information, and may be able to extract relevant information without the intervention of a human operator. Numerous variations and combinations of these general approaches are possible.

The process flow of the method for assigning a rating to a fund commences with the identification of a sector corresponding to the fund, as indicated by block 10. An example of a sector is U.S. large capitalization funds. Other sectors are U.S. small capitalization funds, and European large capitalization funds. It will be understood that any defined universe of securities that has a financial future associated therewith may be regarded as a sector. The step of identifying a sector would ordinarily be carried out manually. A program may prompt the user to select a sector from a menu of choices.

The next step in the method is to identify financial futures corresponding to the identified sector. This is indicated by block 20. An example of futures for a sector is S&P 500 options and futures for U.S. large capitalization funds. This step may be carried out automatically by the software, using a table matching sectors to futures. Alternatively, the user may select the suitable financial futures and provide that information to the software as an input.

The next step is to calculate the expected median returns for the sector using the identified options and futures, as indicated by block 30. The expected median return is calculated fairly simply, by annualizing the percentage increase between the current value of the index and the futures price. Both the current value of the index and the futures price are readily available figures. For example, if the current price of the S&P 500 is 1264.74, and the price of options expiring in one year is 1328.8, then the expected median return is 5.06%. This result is obtained by simple division. Of course, options expiring at times other than one year may be employed for this step.

The next step is the calculation of the expected range in future returns as implied by prices of options on the futures and a suitable option pricing model, as indicated by block 40. The standard deviation in the return is calculated, based on known mathematical techniques. The Black-Scholes technique is known to provide the necessary methodology. The necessary techniques are explained, for example, at pages 122-126 of Robert W. Kolb, *Options: The Investor's Complete Toolkit* (New York Institute of Finance 1991). The inputs are the current price of the security, which in this case is the price of a basket of investments in the sector, such as the S&P 500, the current exercise price of the option, the risk-free interest rate, a current call price for the security, and the time until expiration of the option. The current exercise price, or strike price, is readily obtained from published sources. The risk-free interest rate is typically an interest rate for U.S. Treasury securities of a selected term. For example, 10-year U.S. Treasury securities may be employed. If desired, other low-risk securities may be employed. The current call price for the security is generally readily obtained from published sources. The time until the expiration of the options depends upon the day of the calculation.

The inputs are used in the following equation for the Black-Scholes Option Pricing Model for a call option:

$$C = SN(d_1) - Ee^{-rt} N(d_2)$$

where C is the call option price, S is the price of the security, E is the current exercise price, n is the risk-free interest rate, and N( ) is a cumulative normal distribution function, that is, the probability that a normally distributed variable with a zero mean and a standard deviation of 1.0 will have a value equal to or less than the value.

and $d_1 = (\ln(S/E) + (r + 0.5\sigma^2)t)/\sigma\sqrt{t}$ and $d_2 = d_1 - \sigma\sqrt{t}$ where t is time, ordinarily expressed in years, and σ is the standard deviation of the fund's returns. The standard deviation can be obtained by iteratively selecting proposed standard deviations, until a satisfactory result is obtained. This may readily be programmed in software, and is available with software provided with Kolb, *Options: The Investor's Complete Toolkit*. The standard deviation is preferably annualized, by multiplying a daily standard deviation by a factor equal to the square root of the time period, e.g., the square root of 250, based on a 250 trading day year.

The next step is the calculation of the annualized return for each fund, as indicated by block 50. The annualized return for each fund is calculated based on historical data of the value of each fund over a selected historical period. The historical period is ordinarily a period of years, but may be selected as desired.

The next step is the calculation of an annual return adjustment factor for each fund, as indicated by block 60. The annual return adjustment factor is the difference obtained by subtracting the calculated annualized return for the fund from the median return for the other funds, or for all of the funds, in the sector. It will be appreciated that this step requires calculation of the annual return for numerous funds in a single sector. From these annual returns, the median return is selected.

The next step is the calculation of the negative variability of returns factor for each fund, as indicated by block 70. The negative variability is a percentage factor equal to the extent to which the fund's return are below the median for any given span of time, covering a selected number of selected periods. The fund's historical returns are compared for each selected period, such as quarterly or annually, to the median return, over a period, such as five years. For each period in which the fund's return was less than the median, the difference between the fund's return and the median is calculated. These differences are summed, and divided by the total number of periods. The result is assigned a negative value, which is the negative variability of returns. For example, if over a five year period, a fund's returns were less than the median during ten quarters, the differences between the actual return and the median for each of those ten quarters is calculated. Those differences are summed, and divided by the total number of quarterly periods in the five-year span, i.e., by 20 in this example.

After the negative variability of returns for each fund under consideration in the sector is obtained, then the median negative variability of returns is calculated for all the funds in that sector.

The next step is the calculation of an adjustment for negative variability of returns. This factor is the difference between the negative variability of returns for the fund and the median negative variability of return for funds in the corresponding sector. A positive result indicates that the negative variability of returns for the fund is less negative than the median. A negative adjustment for negative variability of returns indicates that the negative variability of returns for that fund is more negative than the median.

The next step is the determination of the fund group rating, as indicated by block 90. The fund group rating may be on a scale of 1 to 5, and may include an assessment of fund management, efficiency, support, systems and other factors which are reflected in the rating of the fund group. The scale may have as many or as few gradations as desired. It will be understood that this is a qualitative factor; a computer program of the invention may prompt the user for this value. It will also be understood that this step is optional. An adjustment is selected such as from 80% to 110, for fund group and other qualitative factors, as indicated by block 100. The range of possible adjustment factors may be greater or less, as desired.

The next step is the calculation of expected annual returns for each fund, as indicated by block 110. A low return is calculated for each fund. The low expected annual return is equal to the median annualized return for the sector, less the calculated expected range of returns for the sector, plus the fund's annual return adjustment factor, plus the adjustment for negative variability of returns. The method may adjust this by multiplying by a factor equal to the adjustment for fund group. A high expected annual return and a median expected annual return are both calculated for each fund, as indicated by block 120. The high expected annual return adds the expected range of returns. This may also be adjusted by the adjustment for fund group factor. A median of the high and low may be calculated, and a median of expected annual returns for all of the funds in the sector. In summary, as indicated in block 110, a low and a high expected annual return is calculated for each fund based on the expected annualized median return for the corresponding sector, the expected range of returns for each sector, the annual return adjustment factor for the fund, and the adjustment for negative variability.

The next step is the assignment of a fund rating, as indicated by block 130. A fund rating may be assigned based on the median expected annual return and the range from high to low of expected annual returns. A simple algorithm may be created to weight the return and the range. In such an algorithm, as the return increases, the rating increases, and as the range increases, the rating decreases. The rating may be a numerical value, such as from 1 to 6.

The next step is providing the fund rating to a user, as indicated by block 140. This may be done by including the rating in an electronic or printed report to an investor or a financial advisor, for example. The ratings are then employed by the investor or financial advisor in determining whether to make investments in that fund, or to continue to remain invested in that fund.

As noted above, the method may be carried out using a computer system having a processor acting under the direction of software to carry out the steps of the method. The processor may be an Intel Pentium or similar microprocessor. The method can be implemented in custom software, or in spreadsheet software such as Excel. The computer program with commands that cause a computer to execute the method can be stored on any storage medium that now exists or may be developed in the future, including fixed disk drive, floppy discs, and CD-ROM. The computer program may also be transmitted as a digital signal over telephone lines, other transmission lines, or via radio waves. The signal may be transmitted in packets over a packet-switched network, such as the Internet.

The computer program in accordance with the invention may be stored and distributed in any suitable storage medium, such as fixed disk, portable diskettes, and CD-ROM or other read-only memories. Also, methods described as being carried out in software running on general-purpose computer hardware may be implemented in hardware.

It will be understood that various changes in the details, materials and arrangements of the methods and systems which have been described and illustrated above in order to explain the nature of this invention may be made by those skilled in the art without departing from the principle and spirit of the invention.

What is claimed is:

1. A method for predicting expected returns of a fund, comprising the steps of:
    operating a computer to select a sector corresponding to the fund,
    operating the computer to identify financial futures corresponding to the sector,
    operating the computer to calculate an expected return over a time period for the sector based on the financial futures corresponding to the sector,
    operating the computer to calculate an expected range of future returns for the sector based on prices of options for the futures, and
    operating the computer to calculate an expected annual return for the fund based on the expected annualized return for the corresponding sector, the expected range of returns for the corresponding sector, and at least one adjustment factor specific to the fund.

2. The method of claim 1, wherein said at least one adjustment factor includes an annual return adjustment factor equal to the difference between the annualized returns for the fund and a median return for other funds in the sector.

3. The method of claim 1, wherein said at least one adjustment factor includes a factor for the extent to which the funds returns are below the median for that sector for a time period.

4. The method of claim 1, wherein, in the step of calculating expected annual returns for the fund, an adjustment for qualitative factors is made.

5. The method of claim 1, wherein said step of calculating an expected annual return comprises the steps of calculating a low, and a high expected annual return.

6. The method of claim 1, wherein the expected return over the time period is an expected median return.

7. The method of claim 1, wherein
    said at least one adjustment factor includes an annual return adjustment factor equal to the difference between the annualized returns for the fund and a median return for other funds in the sector, and a factor for the extent to which the funds returns are below the median for that sector for a time period;
    in the step of calculating expected annual returns for the fund, an adjustment for qualitative factors is made;
    said step of calculating an expected annual return comprises the steps of calculating a low, and a high expected annual return;
    the expected return over the time period is an expected median return;
    the sector is one of U.S. large capitalization funds, U.S. small capitalization funds and European large capitalization funds;
    the expected return over a time period for the sector is calculated based on an annualization of a current value of an index for the sector and a futures price for the sector;
    the expected range of future returns for the sector is calculated based on the prices of options for the futures and a option pricing model which is based on a current exercise prices of the options, a risk-free interest rate, current call prices for the options, and times until expirations of the options;
    the at least one adjustment factor specific to the fund is a negative variability which is a percentage factor equal to an extent to which returns for the fund are below a median return for a period of time; and
    the period of time for determining the negative variability is divided into selected periods, and a difference between the returns for the fund and the median return are calculated for each period.

8. The method of claim 1, wherein:

the sector is one of U.S. large capitalization funds, U.S. small capitalization funds and European large capitalization funds;

the expected return over a time period for the sector is calculated based on an annualization of a current value of an index for the sector and a futures price for the sector;

the expected range of future returns for the sector is calculated based on the prices of options for the futures and a option pricing model which is based on a current exercise prices of the options, a risk-free interest rate, current call prices for the options, and times until expirations of the options; and the at least one adjustment factor specific to the fund is a negative variability which is a percentage factor equal to an extent to which returns for the fund are below a median return for a period of time.

9. The method of claim 8, wherein the period of time for determining the negative variability is divided into selected periods, and a difference between the returns for the fund and the median return are calculated for each period.

\* \* \* \* \*